LINE JUSTIFYING MEANS AND METHOD IN SELECTIVE PRINTING MACHINES

Original Filed June 7, 1951 3 Sheets-Sheet 1

INVENTOR.
GEORGE C. DEVOL
BY
Jh L Sterling
ATTORNEY

Oct. 29, 1957 G. C. DEVOL 2,811,103

LINE JUSTIFYING MEANS AND METHOD IN SELECTIVE PRINTING MACHINES

Original Filed June 7, 1951 3 Sheets-Sheet 2

Inventor
GEORGE C. DEVOL

By

Attorney

LINE JUSTIFYING MEANS AND METHOD IN SELECTIVE PRINTING MACHINES
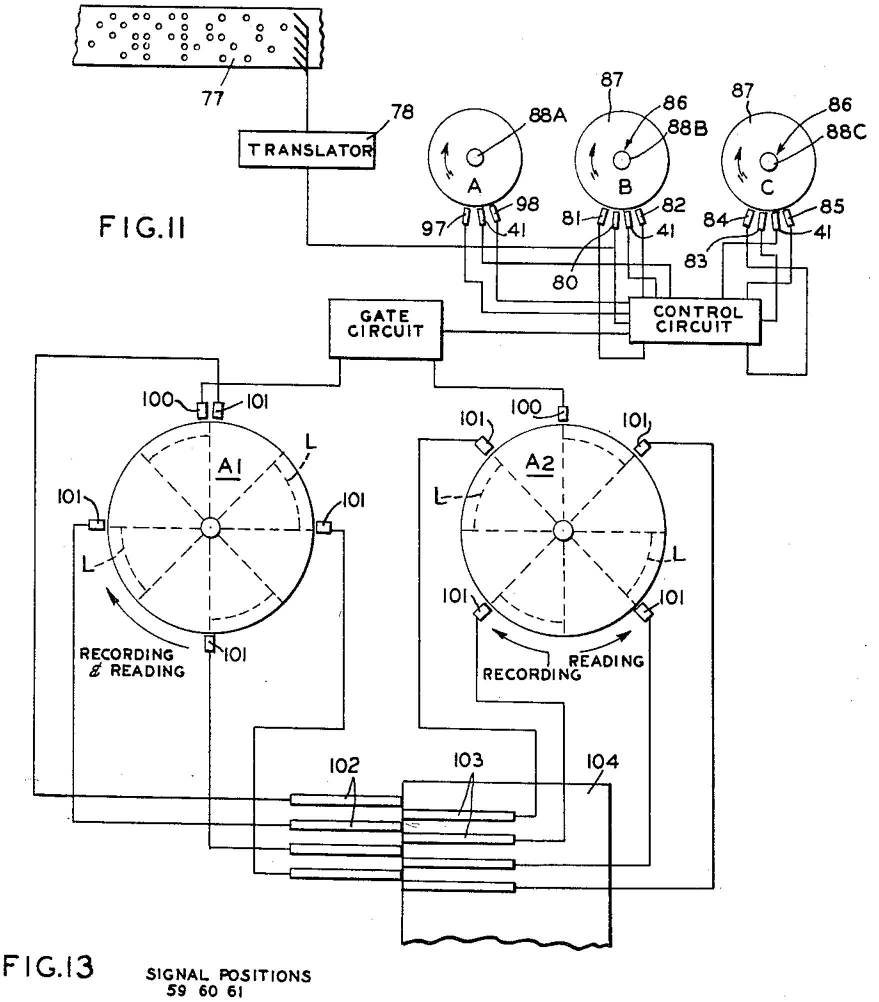
FIG. 11
FIG. 13
SIGNAL POSITIONS
59 60 61
| | | | | | | |
|---|---|---|---|---|---|---|
| COND. 1 | r | e | | l | i | n |
| " 2 | o | r | e | | l | i |
| " 3 | m | o | r | e | | l |
| " 4 | | m | o | r | e | |
| " 5 | e | a | d | | B | |
MARGIN
UNJUSTIFIED:
TRANSFER-ADD 2 SPACES.
RETRANSFER-ADD 1 SPACE.
TRANSFER-ADD 2 SPACES.
TRANSFER-ADD 1 SPACE.
JUSTIFIED
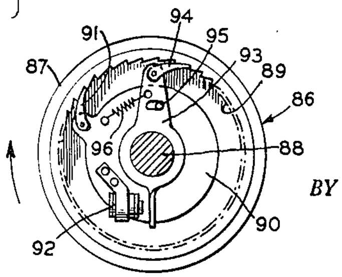
FIG. 12
INVENTOR.
GEORGE C. DEVOL
BY
J. L. Sterling
ATTORNEY 2,811,103

LINE JUSTIFYING MEANS AND METHOD IN SELECTIVE PRINTING MACHINES

George C. Devol, Greenwich, Conn., assignor, by mesne assignments, to Sperry Rand Corporation, New York, N. Y., a corporation of Delaware Original application June 7, 1951, Serial No. 230,345. Divided and this application March 18, 1954, Serial No. 416,976

5 Claims. (Cl. 101—93)

This invention relates to printing, and in particular to a method and means for accomplishing printing at high speed.

In various electronic and other high speed calculating and business machines in use at the present time, the need for printing the output of the machines, as well as the printing of information received at high speed from other sources, has presented a problem that has not been solved by the use of ordinary mechanical printing mechanisms, due largely to the time required in the movements of the mechanical parts; the transmission of motion, and the restoration of the parts after each printing action. This problem is also present due to the rapid sensing of data now possible, such as in the use of a magnetically spotted tape, or a perforated tape, or cards, which can be fed at high speed past a sensing station where the data is sensed, translated from the code in which it may be punched, spotted or otherwise recorded, and to this end one object of the present invention is to print the data as fast as it is received by an arrangement of mechanisms that can carry out the printing operation at an extremely high speed.

A further object of the invention is to so arrange recording, pick-up and printing means with respect to each other that data can be recorded, read, and printed at sufficiently high speeds to keep pace with the imposition of data in a recorder from a source producing the data at extremely high speed.

A still further object is to make use of a single set of type from which the matter is printed in random fashion and in which type a minimum amount of means is employed whose movement, to produce the printing, may be very rapid so that two like characters can be printed successively by the same type piece.

Another object of the invention is to bring about the printing of all characters needed, from a single set of type, by the use of various means which will reduce type movement to a minimum or eliminate any movement of the type entirely so that printing can be accomplished at high speed and with a negligible amount of wear to the parts.

Other objects of the invention include the use of the invention to print pages of matter in a novel line grouping action; to justify the matter so that the finished page has even right and left hand margins; to make unnecessary the use of type wheels, type racks and other type or paper carriers which require adjustment in order to carry on the printing action, and to verify the correctness of the printing automatically as it is being done.

This application is a division of my application Serial No. 230,345, filed June 7, 1951, for Random Printing Method and Means.

A more clear conception of further objects and the operation of the invention may be had from the following specification when read in the light of the drawing, in which.

Figure 1:
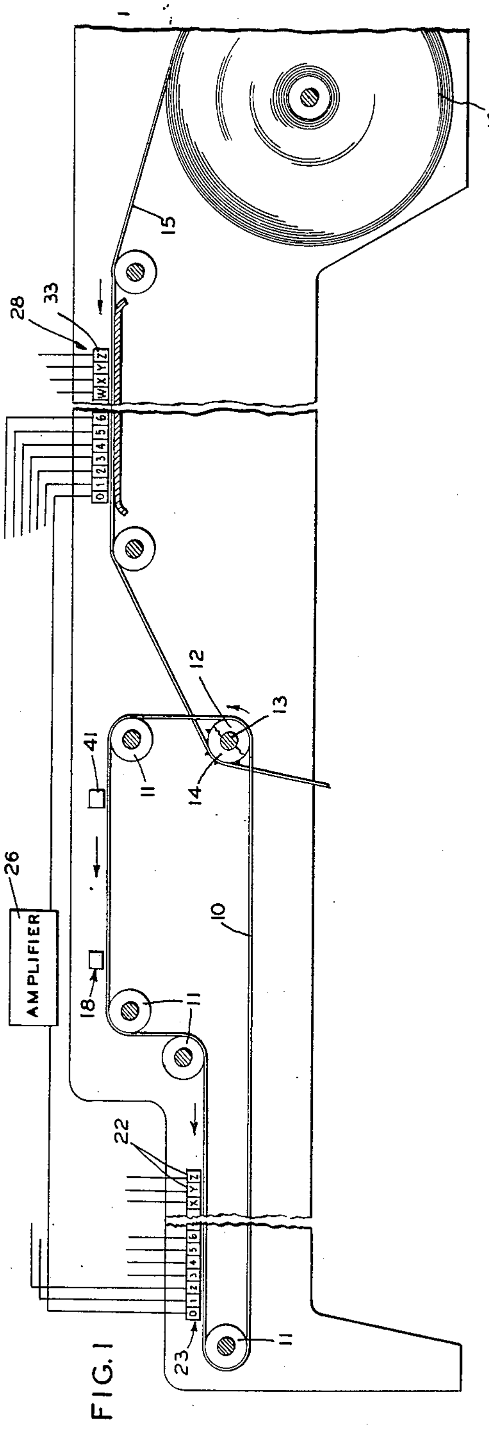
Fig. 1 is a view in longitudinal elevation of the method and means for printing at high speed in accordance with the invention.
Figures 2, 7:
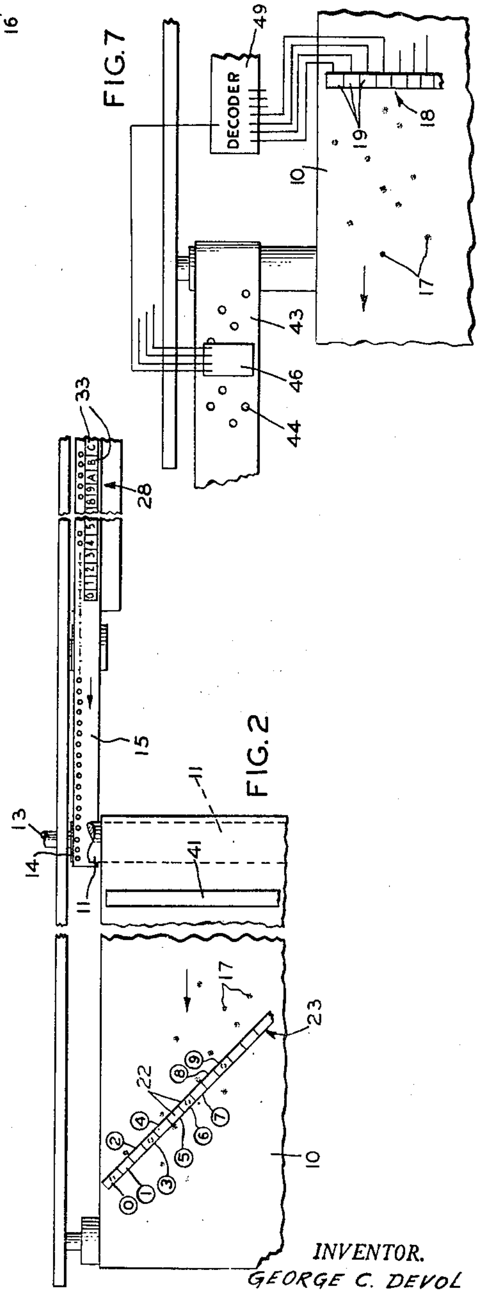
Fig. 2 is a fragmentary view in plan of the invention illustrated in Fig. 1.
Figure 10:
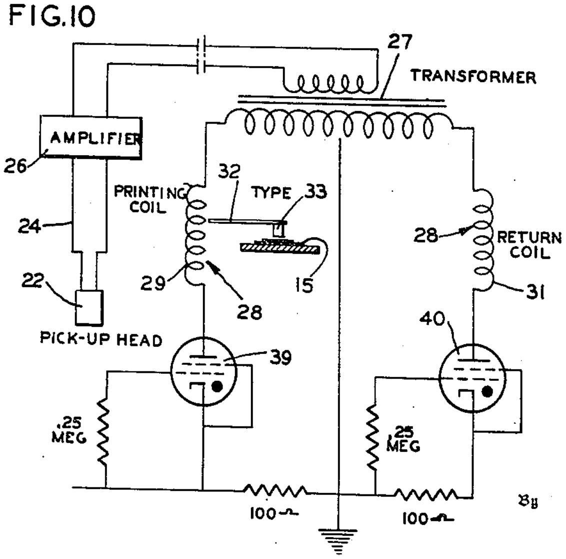
Figures 8, 9:
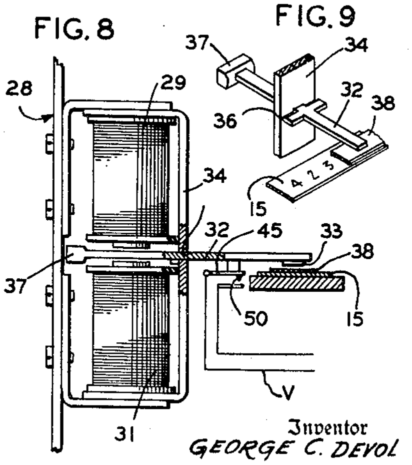

Figs. 3, 4, 5, and 6 are plan views of the recording, reading and printing means shown in diagrammatic relation to each other to illustrate the random printing of characters of an exemplary group;

Fig. 7 is a plan view of the invention as employed in connection with one form of a perforated data carrying medium;

Fig. 8 is a view in side elevation of a type actuator used in the high speed printing mechanism of the invention;

Fig. 9 is an enlarged view in perspective showing the mounting of the type carrier illustrated in Fig. 8;

Fig. 10 is a circuit used in controlling a type actuator as illustrated in Fig. 8, the circuit also including diagrammatically a pick-up head and current amplifying means;

Fig. 11 is a diagrammatic view showing how page printing is accomplished by the method and means of the invention;

Fig. 12 is a view in sectional elevation showing justifying means used in connection with the invention; and Fig. 13 is a chart showing how justification of matter is carried out in connection with the page printing means of Fig. 16.

Referring to the drawing in detail, and particularly Figs. 1–7, inclusive, in which the invention has been shown in various methods of use, 10 indicates an endless magnetic recording tape which may be fed over suitable rollers 11, in the direction indicated by the arrow, by a drive roller 12 mounted on a shaft 13 which is driven by any suitable source of power. The shaft also carries a drive roller 14 of similar diameter to roller 12 so that the peripheral speed of the rollers 12 and 14 will feed a paper tape 15 from a supply source 16 at the same speed of travel and in the same direction as the recording tape 10. The tape 10 may be mounted on a drum instead of being passed over rollers, if desired, and is arranged to receive the characters, of matter to be thereafter printed, in the form of magnetic spots 17 which are applied in the well known manner by a recording head 18 employing the usual pulsating direct current or as disclosed in my application S. N. 659,223, filed April 3, 1946, now Patent No. 2,590,091, granted March 25, 1952, to cause each character unit 19 thereof to magnetically spot the recording tape 10.

The impulses for the magnetizing units 19 of the recording head 18 are derived from the sensing of a perforated teletype tape or any other source of data such as the output of an electronic calculator and may include, in the circuit in which the recording head is included, any type of decoding means, the use of which is well known in the art. The data spotted on the tape in Figs. 3–6, inclusive, is 01024364879B A, each character spot having been imposed on the tape in the sequential order in which it will appear on the printed tape when the printing action for the foregoing example has been completed. As an example of the arrangement of the magnetic spots 17, the tape 10 may be compared to any machine controlling card or tape in which data designations are arranged in vertical columns and longitudinal rows and are located at the intersections of said columns and rows at what are designated as data index positions. As the data, being fed to the recording head is taken from a tape or card whose columns of data are equally spaced, the spots 17 will be imposed on the tape 10 at equally spaced intervals lengthwise of the tape by the units 19 of the recording head 18 which units are spaced equal distances apart widthwise or laterally of the card in a single row. This will result in spots 17 being imposed on the tape at the right angled intersections of imaginary horizontal and vertical, or lateral, lines 20 and 21, respectively so that the sensing units 22 of the pick-up head 23, horizontally aligned with the character units 19 of recording head 18 will lie obliquely across the intersections or data index positions and will sense the spots 17 as they pass under the head 23. This sensing may not occur in the order in which the spots have been imposed on the tape as it will be noted in Fig. 4 that spots "4," "6," and "8" are sensed at the same time as spots "0" and "1" which latter were imposed on the tape in advance of the "4," "6" and "8."

When the magnetized spots 17 pass beneath their respective sensing units 22 of the pick-up head 23 they will produce a pulse in the line 24, Fig. 10, which is increased by the amplifier 26 employing the usual vacuum tube and transformer combination, and fed to the centrally tapped transformer 27 for operation of a printing unit 28 (Fig. 8) including printing and return coils 29 and 31, between the poles of which is loosely positioned a metal strip or armature 32 carrying at its outer end a type character 33. The strip 32 is imprisoned in the frame 34 of the coil holder and preferably includes knife edges 36 and a counter-weight 37 so that free action of the printing type is insured to produce printing at extremely high speed, through the ribbon 38, on the paper tape 15 with a minimum of wear to the parts. The concerted action of the printing and return coils occurs on the positive and negative alternations of the pulse cycle as controlled by the 2050 type Thyratron tubes 39 and 40, in the respective printing and return coil circuits.

Figure 3:
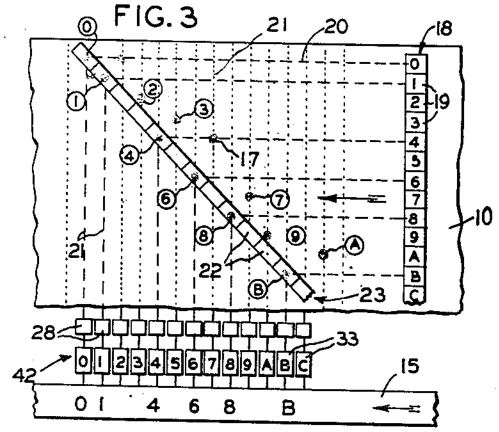
Figure 4:
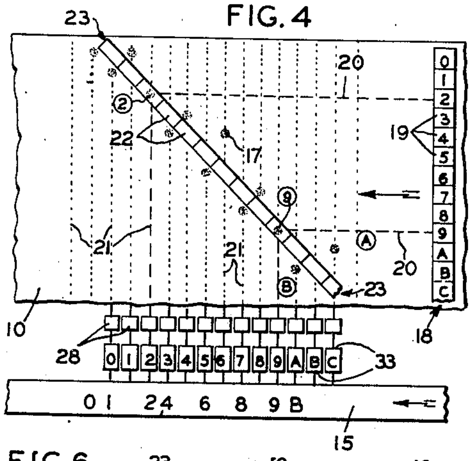
Figure 5:
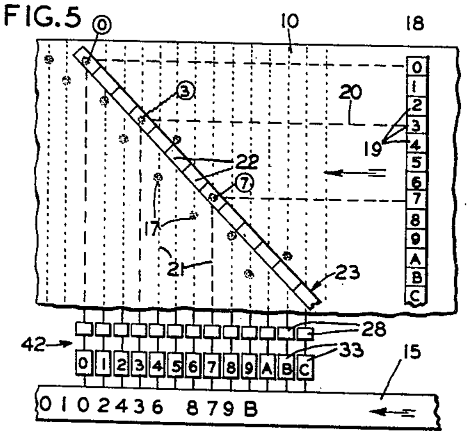
Figure 6:
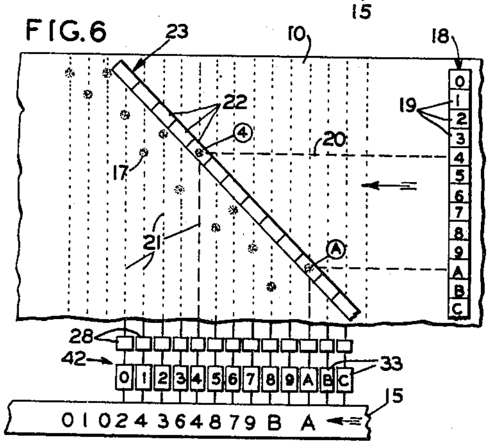

The printing head 42 includes one complete set of numeral printing units 28 from zero to nine and one complete set of units 28 from A to Z together with enough additional units to print other indicia such as periods, commas, and the like, but only one type element bearing any character need be employed. Hence, as shown in Fig. 3, with the tapes 10 and 15 being fed at the same speed; and the character units 19, the sensing units 22 and the printing units 28 all being arranged in the same relative order to each other; and the sensing units 22 being disposed obliquely with respect to the direction of travel of tape 10; it will be observed that to print "01024364879B A" these characters will be entered on the tape 10 in this order by the recording head 18, the units 19 of which receive their impulses from a remote source such as a teletype mechanism. As the spots 17 representing the characters 01468B in the first sensing action are simultaneously sensed by the respective sensing units 22 the corresponding printing units are simultaneously actuated to print these numerals on the tape 15 at the same time, so that their printing on the tape 15, as seen in Fig. 3, appears to be at random. This is also true of the manner in which the spots are sensed by the head 23 and is identified by the term "random printing" in that, while the character spots 17 are imposed on the tape 10 by the head 18 in successive order and in the order that they will appear on the tape 15 after printing has been completed, they are not sensed by the pick-up head or printed by the printing units in this order. In the second sensing action of the head 23 (Fig. 4), the numerals "2" and "9" are simultaneously printed on tape 15, the tapes 10 and 15 having advanced one increment or a space equal to the distance between the lateral lines 21. In the third sensing action of the head 23 (Fig. 5) the characters "0," "3" and "7" are simultaneously printed on tape 15, the tapes 10 and 15 having advanced one more increment. In the fourth sensing action of the head 23 (Fig. 6) the characters "4" and "A" will be printed, the tapes 10 and 15 having advanced one increment. It will be noted that a space occurs on the tape 10 between the spots representing "A" and "B" which space also occurs in the matter as finally printed. While the tapes are fed at high speed and continuously, the word increment does not indicate any step by step action of the tapes although in other forms of the invention this may be done if desired. It is evident that the spots are in thirteen different positions lengthwise of the tape 10 but by a longitudinal movement of the tape 10, embracing only four lateral column spaces, thirteen characters have been sensed and printed. The oblique position of the sensing head will depend upon the speed with which the spots are applied to the tape 10 and by varying the relative speed between the travel of the tapes 10 and 15 the spacing of the characters as they are printed on the tape 15 can be varied. The tape 10 is cleared by the well known action of a demagnetizing head or eraser 41.

Referring to Fig. 7, a tape 43, perforated in code arrangement as at 44, may be sensed by a unit 46 whose impulses are transmitted to the recording head 18 through a decoder 49, the operation of which is similar to that explained in U. S. Patent No. 2,160,152 to W. F. Kelley. Such a decoder may be also utilized in connection with a device of the character shown in Fig. 15 in which a movable perforated record card 47 of the type used for controlling business machines may be sensed by light conducting Lucite rods 48 and photocell equipment included with a decoder 49 as set forth in U. S. Patent 2,224,761 and 2,224,762 for operating the recording head 18 to magnetize the tape 10, which can be read by the pick-up head 23 to print on the card 47 through the printing head 42, the decoded matter of said card.

Verification of the correctness of the printing can be done through the use of a printing element circuit V (Fig. 8) which may be closed by a contact 50, the spring arm 45 of which, actuated by printing action of the respective type strip 32, also serves to retract the latter. The circuit V from each printing unit 28 may be used to operate mechanism to print a verifying record at a remote point where the information supplied to the recording head originated.

Through the use of the invention, which is termed "random printing," line justification as well as page printing may be accomplished and using the basis of the invention as shown in Figs. 3 to 6, page printing is accomplished through receipt of signals for controlling the printing from any suitable source such as a telegraph tape 70 or any medium which will give a signal of constant spacing. These signals are decoded by any suitable circuit or mechanism.

In order to perform page printing it is necessary to justify each of the lines of data received. A page is printed by printing alternate lines thereon as it moves from right to left and then printing the remaining lines as the page is moved from left to right. In order to accomplish this the entire data for the page must be stored in two magnetic storage drums; one, from which the data is read in its correct readable form and the other from which it is read in a reversed form. In order to justify the lines of printing before placing them on the storage drums, the signals are received and recorded on a testing drum of which there are two provided. As the signals and spaces are received they are counted by an electronic commutator, until the correct number of signals have been entered, plus one, to fill a line across the page. As the signals are received they are tested, particularly the last three signals, to determine whether the data at the end of the line ends in the middle of a word, a space, or the end of a word. Should the sensing disclose that the line ends in the middle of a word, a control circuit will cause the data on the first drum to be read off on to a second drum and as the data is read off and a space between words sensed by the testing head a clutch causes the drum to be advanced one quarter of a word space thus advancing the signals by that amount at each word space until two or less complete character spaces have been used up. The end of the line is again tested to determine whether the line is justified and if not, the data is read back to the first drum and the necessary spaces added to complete justification. When the data from the first drum was read on to the second drum, any signals beyond a certain predetermined point are switched by the control circuit to a third storage drum where they remain until the lines are completely justified.

When a line has been justified the signals composing said line are read off and passed by a control circuit through a gate circuit which guides the signals to one of two storage drums. The two storage drums are provided so that alternate lines may be stored therein until the data for a complete page has been stored.

Referring to Fig. 11, signals from a telegraph tape 77 pass through a translator 78 and are entered by a recording head 80 on the drum B as magnetic spots. An electronic counter, forms of which are well known, count the number of lines until sixty-one signal positions have been received. At that time the feed for tape 77 is stopped. Continued rotation of drum B passes the signals in the last three signal positions, i. e., 59, 60 and 61 past the test head 81 and if it is found that there are three characters; a space and two characters; or a character, a space and a character; in these three positions, the control circuit then causes the reading head 82 to read the data from drum B and enter it by means of recording head 83 on drum C. As the data is recorded on drum C and passes test head 84 of that drum, each word space is sensed and a supplemental drive 86 (Fig. 12) is actuated to advance the drum one-quarter of a word or signal space. Should it be found upon testing the data on drum B that a "character, space, character" condition exists only the one-quarter increments necessary to add the equivalent of one space will be entered between words, thus justifying the line. Should a "space, character, character" condition be sensed then the increments equivalent to two spaces will be added between the words to justify the line. Should the condition "character, character, character," be sensed, then two spaces will be added as the data is placed on drum C but this will result in a condition of "character, space, character" being sensed by the test head 84 associated with drum C which will cause the control circuit to read data through reading head 85 of drum C and back on to drum B during which feeding the space equivalent to one word space will be added between words.

Reference to Fig. 13 will show the different combinations of character and space which may occur in justifying a line which ends "print more lines." The drum B had only received the letters "lin" of the word "lines" when the tape 77 was stopped. This results in the testing head 81 of drum B finding a "character, character, character" condition which as described above necessitates the transference of the data from drum B to drum C and then back to drum B. It will be obvious why three test spaces are used, as a condition such as that shown in condition 5 may arise wherein a single character such as reference letter "B," the article "*a*," or a pronoun "I" may occur.

Each of the drums B and C carries a supplemental drive 86 as shown in Fig. 12 which is composed of a rotating member 87 loosely mounted on individual shafts 88. One end of the member 87 has formed thereon an internal ratchet 89. Secured to shaft 88 is a disc 90 lying within the plane of the ratchet 89 and having a drive pawl 91 and an electromagnet 92 secured thereon. Loosely mounted on shaft 88 is a bell-crank 93 one arm of which is an armature for the magnet 92 and the other of which carries a pawl 94. Both pawls 91 and 94 are spring pressed into engagement with the teeth of ratchet 89. The bell-crank 93 is connected to disc 90 by a pin 95 thereon and a slot in the bell-crank. The bell-crank is held in the normal position as shown by a spring 96.

As the data to be justified is transferred from drum B to drum C the test head 84 of the latter senses each word space and the magnet 92 is energized to rock bell-crank 93 clockwise to advance the element 87 one quarter of a word space with respect to shaft 88. The pawl ratchets idly into a new driving position and continues to drive the drum after the magnet 92 is deenergized. The spring 96 then rocks bell-crank 93 to a new position preparatory to the next signal. In this manner space is added in increments between the signals comprising words until the line is justified.

It is obvious that, as the data is transferred from drum B to drum C during justification, certain signals representing the characters "1, i, n," are to be dropped such as in condition 1 of Fig. 13. When data is transferred from one drum to another and sixty-one signal positions have been counted by the electronic commutator, any signals still remaining on the drum will be transferred through the control circuit and recording head 97 to a drum A where they will remain until the line is fully justified. After a full line has been justified and transferred from either drums B or C to storage drums A1 and A2, the leftover signals are then transferred by reading head 98 from drum A to drum B and feed for tape 77 is again restarted to enter a new line on drum B for testing.

Each drum A, B and C, is provided with an erasing head 41 which is under control of the control circuit. Drums A1 and A2 are provided with one recording head 100 and as many reading heads 101 as are necessary to complete a page of printing. In the diagram four reading heads per drum are shown. The letters L indicate the area covered by a line of printing. Each reading head 101 of drum A1 is connected to a printing unit 102 and each reading head 101 of drum A2 is connected to a printing unit 103. The drum A1 after having received all of the justified lines is rotated in the same direction as during recording and the lines are read simultaneously by reading heads 101 to actuate the printing units 102 as the page 104 is fed from right to left. When the page 104 has completed its travel and the alternate lines are printed drum A1 is stopped and drum A2 is rotated in a direction opposite to that during recording and the reading heads 101 read the lines in reverse order to actuate the printing units 103 as the page 104 is fed from left to right, thereby printing an entire page in two movements of the paper.

It is obvious that by providing the necessary printing units one under the other and not staggered as above that complete pages may be printed as a web of paper is fed lengthwise from right to left in a continuous motion. The web may then be cut into pages.

Because the operating impulses set up in the system are handled in circuit form, it is evident that the various units of the mechanism can be remote from each other. For instance, the source of the data impressed on a recording head can be distant from the recording station and likewise a printing unit can be remote from a sensing unit. While the linear order of these units coincide, any order of characters may be used as desired and not the numerical and alphabetical order as illustrated in the drawings. The method herein disclosed is susceptible of many variations, such for instance as; by providing a take-up in the feed of either of the tapes, intermittent in-put and constant out-put may be attained or one or more magnetic tapes and plural recording heads may be used with different spacings between a related recording head and reading head of a set so that printing may be done on a single tape by mechanically actuated printing mechanism spaced apart a distance corresponding to the distance separating the reading heads so that a time lag is provided that allows for the mechanical operation of printing mechanisms such as used in a typewriter. The printing could be done on the same tape from which the data was read, if desired, and while magnetically recorded spots are employed because of the extremely high speed with which they can be imposed on the tape, it is within the scope of the invention to employ punched holes if desired, whose sensing could be accomplished in any of the known ways, such for instance, as by electrical contacts or brushes or light conveying tubes. Also the detection by photocell of spots and configurations of indicia other than spots which may be employed with or without code translating means is within the prevision of the invention.

While I have described what I consider to be highly desirable embodiments of my invention, it is obvious that many changes in form could be made without departing from the spirit of my invention, and I, therefore, do not limit myself to the exact form herein shown and described, nor to anything less than the whole of my invention as herebefore set forth, and as hereinafter claimed.

What I claim as new, and desire to secure by Letters Patent, is:

1. The method of justifying a line of data on a page, comprising magnetically recording spots representative of said data on a first test drum, counting the data spots of each line to determine whether a justified condition exists with respect to predetermined end groups in each line, transferring said data spots to a second magnetic drum should an unjustified condition be determined in any of said groups, and spacing said data spots during the transference until said line is justified, and then transferring the data of said justified lines to a storage means.

2. In a device for equalizing the length of, and printing lines of matter; a first moving record drum; means for recording on said drum, in column by column order, representations of spaced word matter forming a line; means for testing a group of columns at the end of the line to determine the extent of the line with respect to a desired margin; a second moving record drum; means for transferring a line, terminating short of register with said margin, to said second drum; means for increasing the extent of normal movement of said second drum to enlarge spaces between the word matter to terminate said line at the margin; a storage drum; means for transferring the justified line to said storage drum; means disposed diagonally of said storage drum for sensing the representations in a plurality of columns simultaneously; a fixed printing unit beneath which a page moves, said unit including a single movable type member for each character to be printed; and means controlled by said sensing means for actuating one or more of said type of the unit to print at random in a line on said page.

3. In a device for justifying lines of matter to be printed; first, second and third moving record drums; means for recording on the second drum, in column by column order representations of spaced word matter forming a line; means for testing the marginal end of the line at a plurality of signal positions to determine the extent of the line with respect to a desired margin; means for transferring a line, terminating out of register with said margin, to said third drum; means for increasing the extent of normal movement of each of said second and third drums to enlarge spaces between the word matter; means for transferring a line, partly justified by the movement increasing means of said third drum, to the second drum to be fully justified by the movement increasing means of said second drum; means for transferring excessive word matter beyond the margin of the fully justified line to said first drum; means for reading the justified line off said second drum; and means for transferring the excessive word matter from the first to said second drum.

4. In a device for justifying and printing lines of matter; first and second moving record drums; means for recording on said first drum in column by column order representations of spaced word matter forming a line; means for testing the marginal end of the line at a plurality of signal positions to determine the extent of the line with respect to a desired margin; a storage drum; means for transferring a line, terminating at the margin, from the first drum to said storage drum; means for transferring a line, terminating out of register with said margin to said second drum; means for increasing the extent of normal movement of the second drum to enlarge spaces between the word matter to terminate the line at the margin; means for transferring the justified line from the second drum to said storage drum; means disposed diagonally of said storage drum for sensing said representations in a plurality of columns simultaneously; a fixed printing unit corresponding to a line to be printed on a page moving lengthwise of and beneath the unit, said unit including a single moveable type member for each character to be printed; and means controlled by said sensing means for actuating one or more of said type of the unit to print at random in a line on said page.

5. In a device for equalizing the length of, and printing lines of matter; a first moving record drum, means for recording on said drum, in column by column order, representations of spaced word matter forming a line; means for testing a group of columns at the end of the line to determine the extent of the line with respect to a desired margin; a second moving record drum; means for transferring a line, terminating short of register with said margin from the first to said second drum; means for increasing the extent of normal movement of said second drum to enlarge spaces between said word matter to terminate the line at the margin; a pair of storage drums; means for transferring justified lines to said storage drums alternately; a plurality of means disposed diagonally of each of said storage drums for sensing representations in a plurality of columns simultaneously; groups of fixed printing units corresponding with each storage drum and beneath which a page moves, each unit including a single movable type member for each character to be printed; and means controlled by the sensing means of each storage drum for actuating one or more of said type of each corresponding unit to print at random in alternate lines on said page.

References Cited in the file of this patent

UNITED STATES PATENTS

| | | |
|---|---|---|
| 1,466,491 | Schaffer | Aug. 28, 1923 |
| 1,656,106 | Egli | Jan. 10, 1928 |
| 2,353,631 | Bliss | July 10, 1944 |
| 2,357,456 | Bryce | Sept. 4, 1944 |
| 2,424,076 | Buhler | July 15, 1947 |
| 2,513,112 | Shepherd | June 27, 1950 |
| 2,513,683 | Shaper | July 4, 1950 |
| 2,517,808 | Sziklai | Aug. 8, 1950 |
| 2,560,474 | Potts | July 10, 1951 |